United States Patent
Lee

[11] Patent Number: 6,049,356
[45] Date of Patent: Apr. 11, 2000

[54] METHOD OF DOUBLING VERTICAL LINE SPEED FOR HDTV CAMERA AND DEVICE THEREOF

[75] Inventor: Hyo-Seung Lee, Seoul, Rep. of Korea

[73] Assignee: Samsung Electronics Co., Ltd., Kyungki-do, Rep. of Korea

[21] Appl. No.: 08/901,237

[22] Filed: Jul. 25, 1997

[30] Foreign Application Priority Data

Jul. 27, 1996 [KR] Rep. of Korea ...................... 96-30878

[51] Int. Cl.[7] ................................................ H04N 3/14
[52] U.S. Cl. .................. 348/262; 348/265; 348/236; 348/453; 358/514; 358/483
[58] Field of Search .................................. 348/262, 265, 348/222, 234, 236, 336, 337, 445, 453, 458, 556; 345/138; 358/514, 482, 483

[56] References Cited

U.S. PATENT DOCUMENTS

| | | | |
|---|---|---|---|
| 5,436,661 | 7/1995 | Yamamoto et al. | 348/264 |
| 5,576,760 | 11/1996 | Akiyama | 348/231 |
| 5,640,206 | 6/1997 | Kinoshita et al. | 348/264 |
| 5,657,082 | 8/1997 | Harada et al. | 348/262 |
| 5,719,633 | 2/1998 | Nishio et al. | 348/445 |

FOREIGN PATENT DOCUMENTS

| | | | |
|---|---|---|---|
| 0 090 504 | 7/1982 | United Kingdom | H04N 3/16 |
| 2 090 505 | 7/1982 | United Kingdom | H04N 3/16 |

*Primary Examiner*—Wendy Garber
*Assistant Examiner*—Mitchell L. White
*Attorney, Agent, or Firm*—Sughrue, Mion, Zinn, Macpeak & Seas, PLLC

[57] ABSTRACT

A device and method of doubling a vertical line speed for a camera for domestic use, the method including the steps of a) writing G1 channel data output from a G1 CCD of a 4CCD for a period of 0.5H, where H is a horizontal sync period, and then reading the written G1 channel data at a speed twice a first writing speed, b) writing G2 channel data output from a G2 CCD of the 4CCD for a period of 0.5H, and then reading the written G2 channel data at a speed twice a second writing speed, and c) alternately selecting data read out by the steps a) and b), thereby outputting G signals of a broad-band. As a result, the line memory of 4H used in a device of doubling a line speed of a G channel signal can be reduced to 1H.

5 Claims, 4 Drawing Sheets

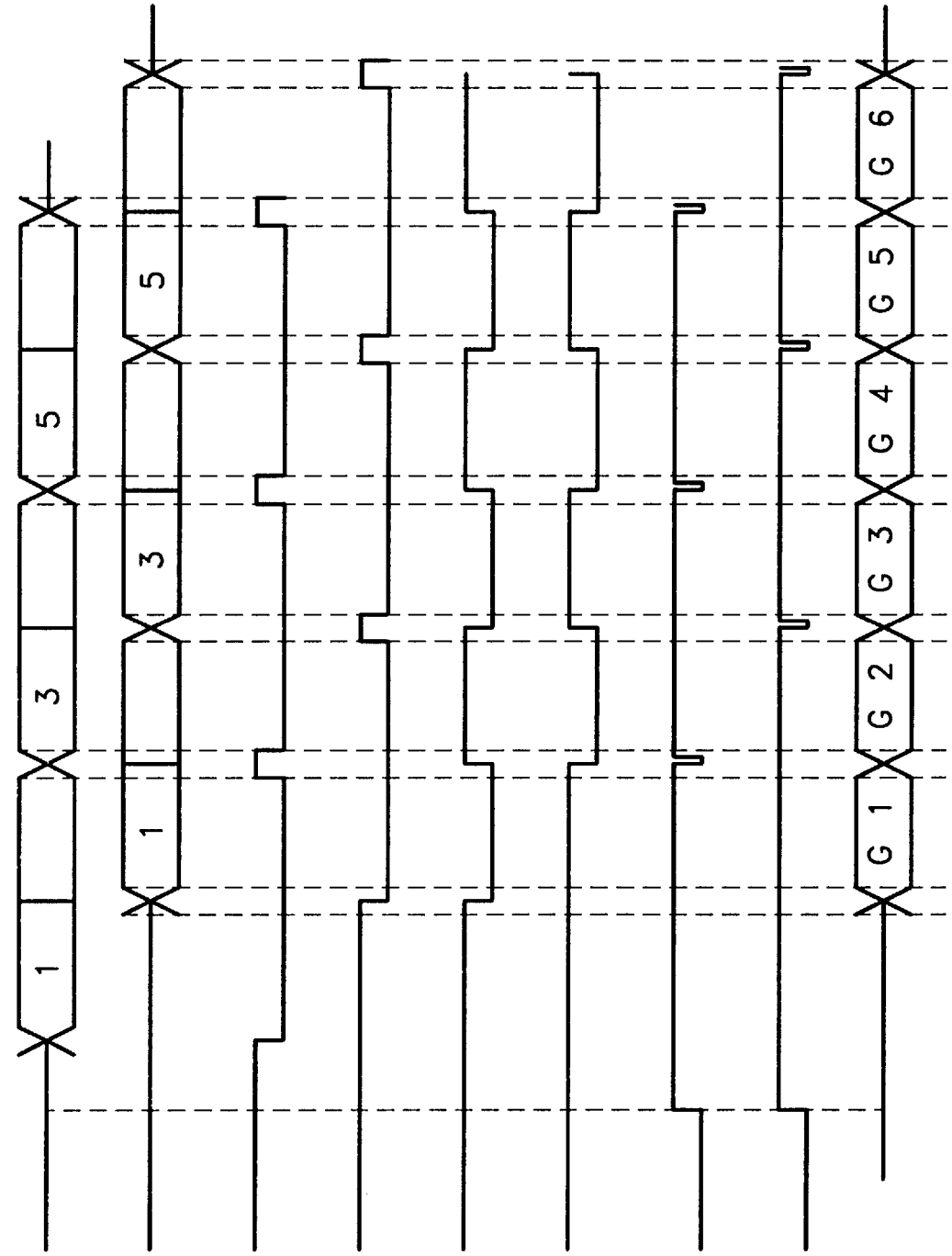

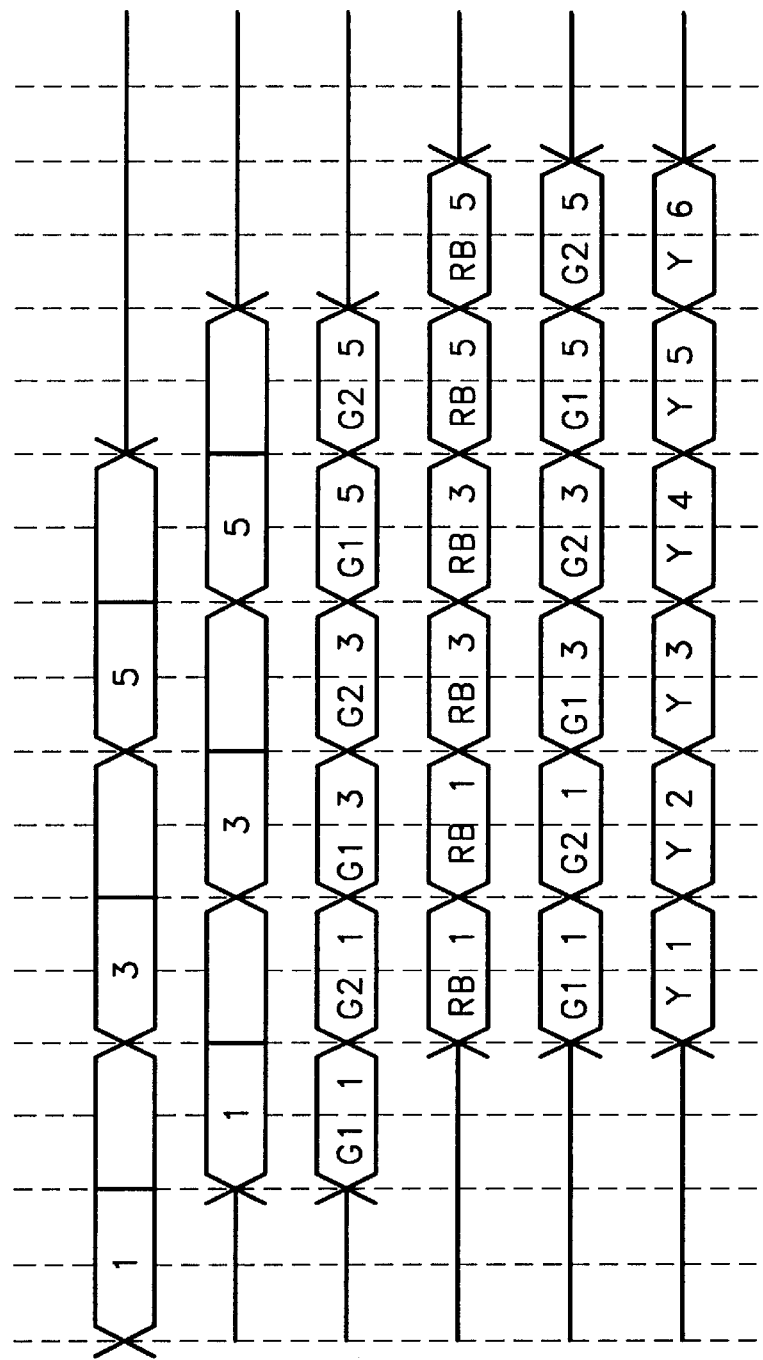

METHOD OF DOUBLING VERTICAL LINE SPEED FOR HDTV CAMERA AND DEVICE THEREOF

BACKGROUND OF THE INVENTION

1. Field of the Invention

The present invention relates to a method of doubling a vertical line speed for a high definition television (HDTV) camera for domestic use and a device thereof, and more particularly, to a method of doubling a vertical line speed by which the number of vertical scanning lines are doubled in order to obtain vertical line frequency for HDTV using a general-purpose 4-charge coupled device (CCD) and to a device thereof. The present invention is based on Korean Application No. 96-30878, which is incorporated herein by reference.

2. Description of the Related Arts

In general, digital broadcast for a wide television or an HDTV has an aspect ratio of 16:9, rather than 4:3 of a conventional NTSC broadcast. Accordingly, the digital broadcast cameras for a business or a general broadcasting system require various standards.

Currently, a single-layer CCD (LCCD) used for the camera is mainly for domestic use, and a triple-layer CCD (3CCD) is for business use or a broadcasting station. As the number of the CCD is increased, performance of the camera becomes better, but the apparatus becomes more costly. A quadruple-layer CCD (4CCD) camera having a structure more complicated than that of the 3CCD camera has better performance than that of the 3CCD camera. Also, the 4CCD camera can obtain the output of the camera, meeting the standards of the HDTV and resolution thereof. Here, the standards of the HDTV means the Japanese High-Vision standards having 1035 effective vertical lines of 1125 total vertical lines and 1920 effective horizontal pixels of 2200 total horizontal pixels, and the GA-HDTV standards proposed by Grand Alliance of U.S.A. having 1035 effective vertical lines of 1125 total vertical lines and 1258 effective horizontal pixels of 1440 total horizontal pixels, the ATV standards having 1080 effective vertical lines of 1125 total vertical lines and 1920 effective horizontal pixels of 2200 total horizontal lines, and the HD standards having 1024 effective vertical lines of 1125 total vertical lines and 1008 effective horizontal lines of 1200 total horizontal lines. The HDTV camera employing 4CCD for domestic use is inexpensive and interchangeable for use in the existing NTSC and wide TV. For the domestic use 4CCD camera, Hi-Vision standards of 16 to 9 in which the number of total pixels are 808H×518V, wide-TV standards of 16 to 9 in which the number of total pixels are 754H×485V, and SD NTSC standards of 4 to 3 in which the number of total pixels are 566H×485V can be used.

FIG. 1 is a block diagram showing a schematic structure of a camera system employing a conventional 4CCD. Each signal output from G1 CCD 102, G2 CCD 104, R CCD 106, and B CCD 108 is processed as an analog signal in each pre-amplifier (PA) 112, 114, 116, and 118, respectively, and then input t o an A/D converter 120.

Four channels converted to digital data in the A/D converter 120 (i.e., the outputs of G1 (Green 1), G2 (Green 2), R (Red) and B (Blue)) are supplied to a G vertical line doubler (VLD) 130 and an R/B VLD 140. Here, the green (G) channel, whose signals are approximately 70% of all signals and have high light-receiving sensitivity, are comprised of two channels. That is, the G channel can be constituted by G1 and G2 channels using a line memory (not shown) of 2H delay, in which H is a horizontal sync period, respectively.

A speed of a R(Red)/B(Blue) channel is doubled through two lines each using the line memory of 2H. Accordingly, when a line frequency of 16.875 KHz is input to the G and the R/B channels, a line frequency of 33.75 KHz, which is twice the input line frequency, is output. The line frequency input to the line speed doublers of G and R/B channels is 16.875 KHz, and the line frequency output therefrom is 33.75 KHz. Here, the line frequency of 33.75 KHz is based on a formula 1125×30, where 1125 indicates the number of lines per frame and 30 indicates the number of frames per second in the case of the HDTV. Accordingly, the line frequency shown in FIG. 1 can be changed by frame rate per second or line number per frame, and the input line frequency is half the output line frequency.

A general CCD usually supplies data of approximately 500 lines per frame. However, since the HDTV broadcasting requires data of approximately 1000 lines per frame, the vertical line doubler is required for HDTV employing the conventional CCD.

In the case of the G-channel output from the G VLD 130, vertical detail is processed in a detail digital signal processor (DSP) 150 having a memory (not shown) of 2H, and data of the detail-processed G channel is input to a color matrix 160.

The color-difference (G-Y) signal output from the color matrix 160 and the G channel signal output from the 2H detail DSP 150 form a luminance (Y) signal in a subtracter 162, and the Y signal and color-difference signals Pb and Pr output from the color matrix 160 are converted to analog signals via a D/A converter 170.

As shown in FIG. 1, in the case of a conventional G channel, between VLD devices 130, 140 and the color matrix 160, detail horizontal and vertical signals are processed using 2H memory (not shown). Here, the G channel is delayed by 1H, and the R/B channel does not perform detail-processing, to thereby generate a signal delay difference of 1H between the G-channel and the R/B channel.

SUMMARY OF THE INVENTION

Accordingly, it is an object of the present invention to provide a method for preventing delay between signals and saving memory necessary for doubling a line speed in a HDTV camera using 4CCD for domestic use.

It is another object of the present invention to provide a device for preventing delay between signals and saving memory necessary for doubling a line speed in a HDTV camera using 4CCD for domestic use.

To accomplish the first object of the present invention, there is provided a method of doubling the number of vertical lines so that camera output signals are transmitted using 4CCD, i.e., G1 CCD, G2 CCD, R CCD and B CCD comprising the steps of: a) writing G1 channel data output from the G1 CCD of the 4CCD for a period of 0.5H in which H is a horizontal sync period and then reading the written data more rapidly by twice than a first writing speed; b) writing G2 channel data output from the G2 CCD of the 4CCD for a period of 0.5H and then reading the written data more rapidly by twice than a second writing speed; and c) alternately selecting data read out from the steps a) and b), thereby outputting G signals of a broadband.

To accomplish another object of the present invention, there is provided a device of doubling a vertical line speed having a circuit doubling the number of vertical lines in order to transmit output signals using a quadruple-layer CCD (4CCD), i.e., G1 CCD, G2 CCD, R CCD and B CCD, comprising a first memory for writing G1 channel data output from the G1 CCD of the 4CCD for a period of 0.5H in which H is a horizontal sync period and then reading data more rapidly by twice than a first writing speed, a second memory for writing G2 channel data output from the G2 CCD of the 4CCD of a period of 0.5H, and then reading written data more rapidly by twice than a second writing speed, and selection means for alternately selecting data read out from the first and second memories and then outputting G signals of a broad-band.

BRIEF DESCRIPTION OF THE DRAWINGS

The above objects and advantages of the present invention will become more apparent by describing in detail a preferred embodiment thereof with reference to the attached drawings in which:

FIGS. 3A through 3I are timing diagrams of input/output signals of the vertical line speed doubler shown in FIG. 2; and FIGS. 4A through 4F are timing diagrams when the vertical line speed doubler of FIG. 2 is adapted to the G VLD shown in FIG. 1.

DETAILED DESCRIPTION OF THE INVENTION

Figure 1:
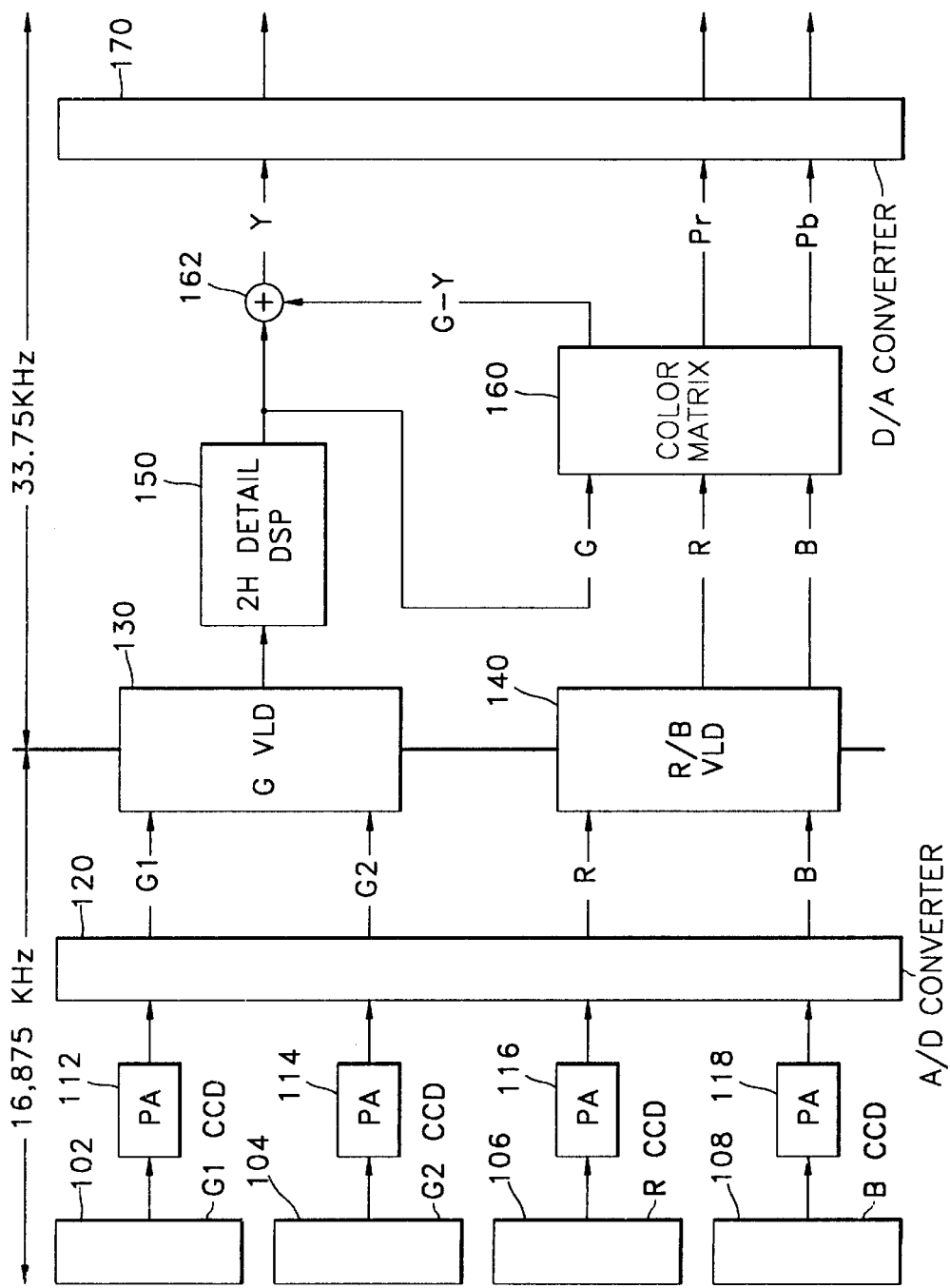
FIG. 1 is a block diagram showing a schematic structure of a camera system employing a conventional 4CCD.
Figure 2:
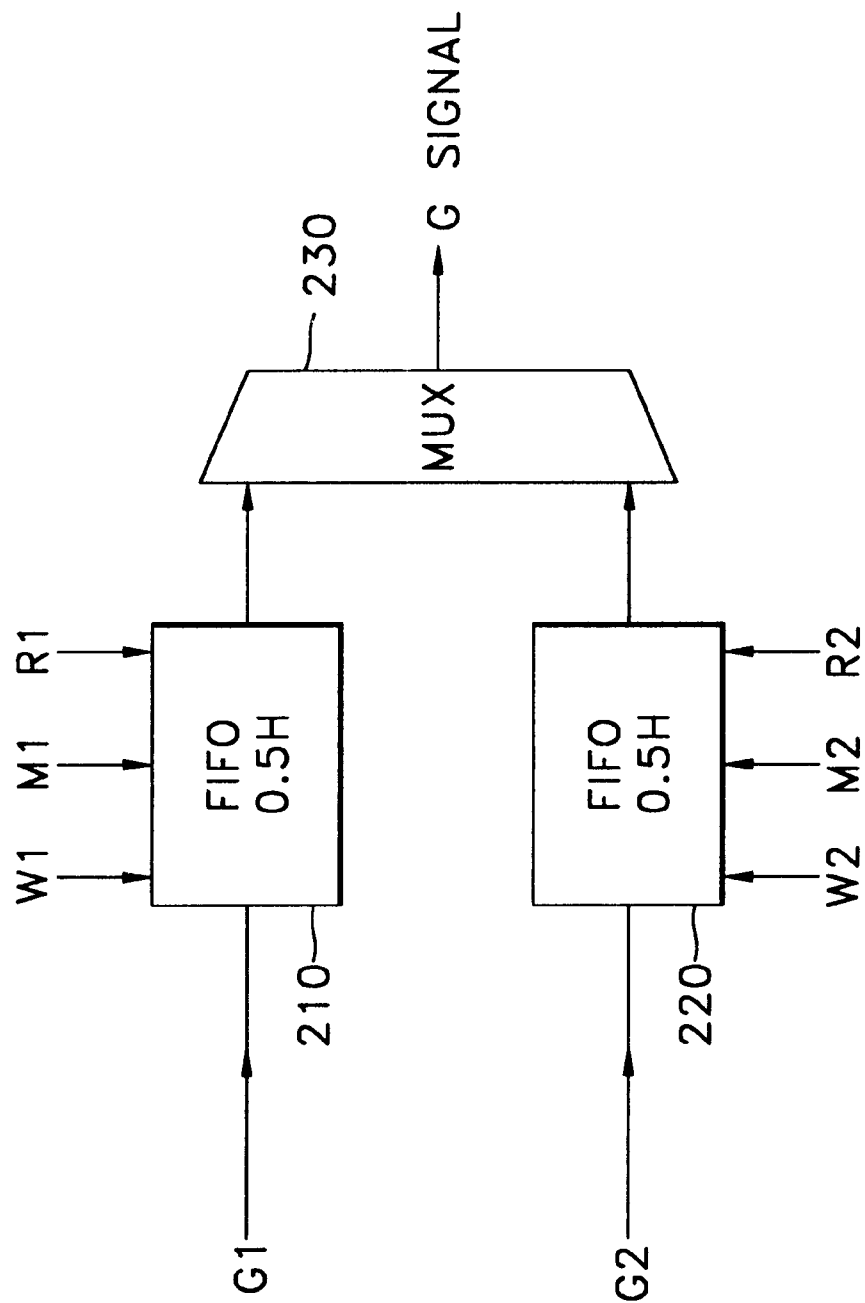
FIG. 2 is a block diagram of a vertical line speed doubler according to the present invention.

The vertical line speed doubler of FIG. 2 can be applied to a G VLD (130) of FIG. 1. FIG. 2 includes a first FIFO memory 210 having a 0.5 horizontal line (0.5H) period for writing G1 data corresponding to the 0.5H and reading stored data at a speed which is twice the writing speed, a second FIFO memory 220 having a 0.5 horizontal line (0.5H) period for writing G2 data corresponding to the 0.5H and reading stored data at a speed which is twice the writing speed, and a multiplexer 230 for selecting the output of the first FIFO memory 210 or the output of the second FIFO memory 220 to output a G signal. In FIG. 2 reference characters W1 and W2 denote write enable signals, reference characters R1 and R2 denote read enable signals, and reference characters M1 and M2 denote master reset signals.

Referring to FIGS. 3A through 3I, a low state represents an enable period, and a high state represents a disable period. That is, when M1 and M2 are low, a memory reset operation is performed, when W1 and W2 are low, a writing operation is performed, and when R1 and R2 are low, a read operation is performed. The frequency of a read clock should be twice than that of a write clock.

Operation of the circuit shown in FIG. 2 will be described with reference to FIGS. 3A through 3I.

As shown in FIG. 2, video signals of G1 and G2 channels picked-up by G1 CCD 102 and G2 CCD 104 of FIG. 1 are A/D converted, and then input to the first and second FIFO memories 210 and 220, respectively. At this time, the input video signals of the G1 and G2 channels are the same as those shown in FIGS. 3A and 3B.

The signal of the G1 channel of FIG. 3A is output 0.5H earlier than that of the G2 channel of FIG. 3B. As shown in FIG. 3C, when a first write enable signal W1 is applied to a first FIFO memory 210 at a start time of a signal of the G1 channel (i.e., 1 of FIG. 3A), data begins to be stored. Also, when an effective pixel period of the G1 channel finishes, the first write enable signal W1 is disabled, and data storage discontinues.

As shown in FIG. 3D, when a second write enable signal W2 is applied to a second FIFO memory 220 at a start time of a signal of the G2 channel (i.e., 1 of FIG. 3B), data begins to be stored. When an effective pixel period of the G2 channel finishes, the second write enable signal W2 is disabled, and data storage discontinues.

As shown in FIG. 3E, when a first read enable signal R1 is applied to the first FIFO memory 210 at a half of a portion of a write enable signal W1 of the G1 channel, data begins to be read. Here, the frequency of the read clock is two times higher than that of the write clock, so that the read data is output more rapidly than the write data. Accordingly, when an effective pixel period of the G1 channel finishes, no data remains in the first FIFO memory 210. A capacity of the FIFO memory 210 consumed by the above-mentioned operation amounts to a data quantity corresponding to approximately 0.5H. That is, a capacity of the FIFO memory 210 used for processing of line doubler signals of G1 and G2 is expressed by a data quantity corresponding to a formula 0.5H×2=1H. As shown in FIG. 3F, when a second read enable signal R2 is applied to a second FIFO memory 220 at a half portion of a write enable signal W2 of the G2 channel, data begins to be read.

A multiplexer 230 selects a first FIFO memory 210 when a signal of the first FIFO memory 210 is output, and selects a second FIFO memory 220 when a signal of the second FIFO memory 220 is output. Accordingly, as shown in FIG. 3I, data of the G1 and G2 channels is output alternately (i.e., in an order of G1, G2, G3, G4, etc.). Here, the first and second FIFO memories 210 and 220 can be composed of a dual port random access memory (RAM), and the multiplexer 230 can be a selection means. In a horizontal synchronization (H-Sync) period of a signal output from the first and second FIFO memories 210 and 220, as shown in FIGS. 3G and 3H, respectively, reset signals M1 and M2 are applied to remove a dummy portion remaining in the memories 210 and 220, respectively.

Thus, the line frequency of 16.878 KHz in the G1 and G2 channels is doubled into the vertical line frequency of 33.75 KHz via the above-described process. Also, in a portion where the effective data in the G1 and G2 channels has not yet started, that is, a vertical sync period, the reset signals M1 and M2 of FIGS. 3G and 3H are applied to remove a dummy portion remaining in the memories 210 and 220.

FIGS. 4A through 4F are timing diagrams when the vertical line speed doubler of FIG. 2 is adapted to the G VLD shown in FIG. 1. As shown in FIG. 4A, a signal of the G1 channel is output 0.5H earlier than the G2 channel of FIG. 4B and the R/B channel (not shown). The output of each CCD is controlled by a control signal generated by a timing generator (not shown). Accordingly, the control signal input to the G1 CCD 102 is 0.5H earlier -than that input to G2 CCD 104 of FIG. 1 and R/B CCDs 106 and 108 of FIG. 1.

Also, the G2 channel rather than the G1 channel may be output 0.5H earlier, and the position of the G1 CCD 102 may be exchanged with that of the G2 CCD 104, while still performing the same operation as described above.

FIG. 4C, which is a timing diagram line-doubled from the G channel VLD device 130, is equal to that of FIG. 3I. FIG. 4D is a timing diagram line-doubled from the R/B channel VLD device 140.

FIG. 4E is a timing diagram of a signal of a G channel delayed by 1H in the detail signal processor 150 using a 2H memory. Accordingly, a signal of the R/B channel is synchronized with that of the G channel. Thus, even though the signals are processed in the color matrix 160, it is possible to solve the time-delay problem.

FIG. 4F is a timing diagram of luminance (Y) data finally output from the subtracter 162 of FIG. 1. The luminance data is synchronized with the G channel data and the R/B channel data to be output in an order of Y1, Y2, Y3, etc.

The present invention may be employed in a video format converter for converting a broadcasting signal of the current method to a signal of an HDTV format as well as in an HDTV camera for domestic use.

According to the present invention, in a HDTV camera using 4CCD for domestic use, it is possible to prevent signals from being delayed, and during realization of a line doubler of a G channel signal, the 4H line memory may be reduced to that of 1H, to thereby reduce costs.

While only certain embodiments of the invention have been specifically described herein, it will apparent that numerous modifications may be made thereto without departing from the spirit and scope of the invention.

What is claimed is:

1. A method for doubling the number of vertical lines by doubling a vertical line speed so as to transmit a camera output signal using a quadruple-layer CCD (4CCD) having a G1 CCD, a G2 CCD, an R CCD and a B CCD, comprising the steps of:

a) writing G1 channel data output from the G1 CCD of said 4CCD for a period of 0.5H at a first writing speed, where H is a horizontal sync period, and then reading the written G1 channel data at a speed twice the first writing speed;

b) writing G2 channel data output from the G2 CCD of said 4CCD for a period of 0.5H at a second writing speed, and then reading the written G2 channel data at a speed twice the second writing speed; and c) alternately selecting data read out by said steps a) and b), thereby outputting G signals of a broad-band.

2. A device for doubling a vertical line speed including a circuit doubling the number of vertical lines in order to transmit output signals using a quadruple-layer CCD (4CCD) having a G1 CCD, a G2 CCD, an R CCD and a B CCD, comprising:

a first means for writing G1 channel data output from the G1 CCD of said 4CCD for a period of 0.5H at a first writing speed, where H is a horizontal sync period, and for then reading the written G1 channel data at a speed twice the first writing speed;

a second means for writing G2 channel data output from the G2 CCD of said 4CCD for a period of 0.5H at a second writing speed, and for then reading the written G2 channel data at a speed twice the second writing speed; and selection means for alternately selecting data the read out from said first and second means, and for then outputting G signals of a broad-band.

3. A device of doubling a vertical line speed according to claim 2, wherein said first and second means include first-in-first-out (FIFO) memories.

4. A device of doubling a vertical line speed according to claim 2, wherein said first and second means include dual port RAMs.

5. A device of doubling a vertical line speed according to claim 2, wherein a lapse of a half of an effective data period exists between the reading of the written G1 channel data and the reading of the written G2 channel data.

* * * * *